March 22, 1955 W. HOPPE 2,704,592
CONVEYER AND TRANSFER MECHANISM FOR WRAPPING MACHINES
Filed May 19, 1951 3 Sheets-Sheet 1
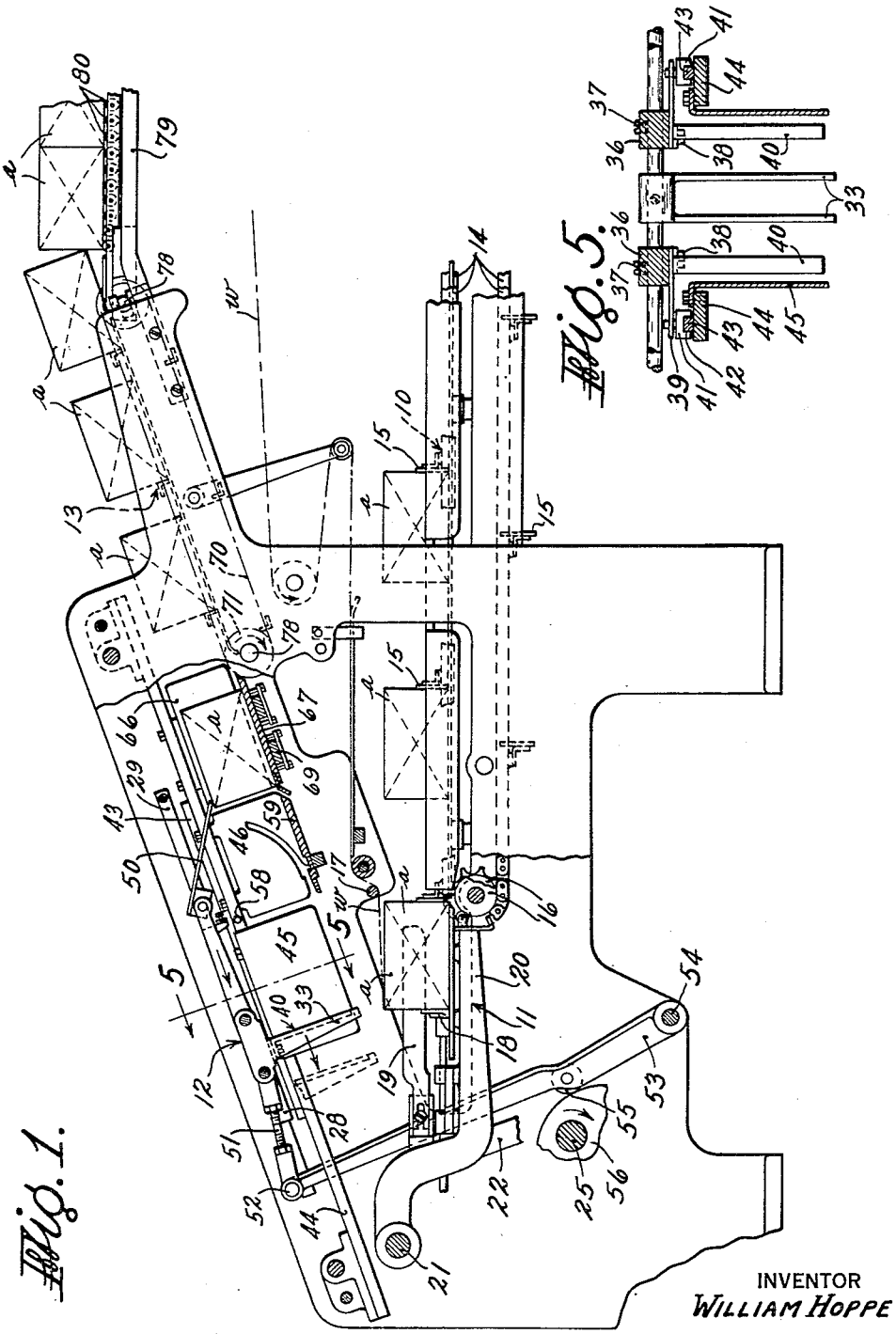
INVENTOR
WILLIAM HOPPE
BY Chapin & Neal
ATTORNEYS

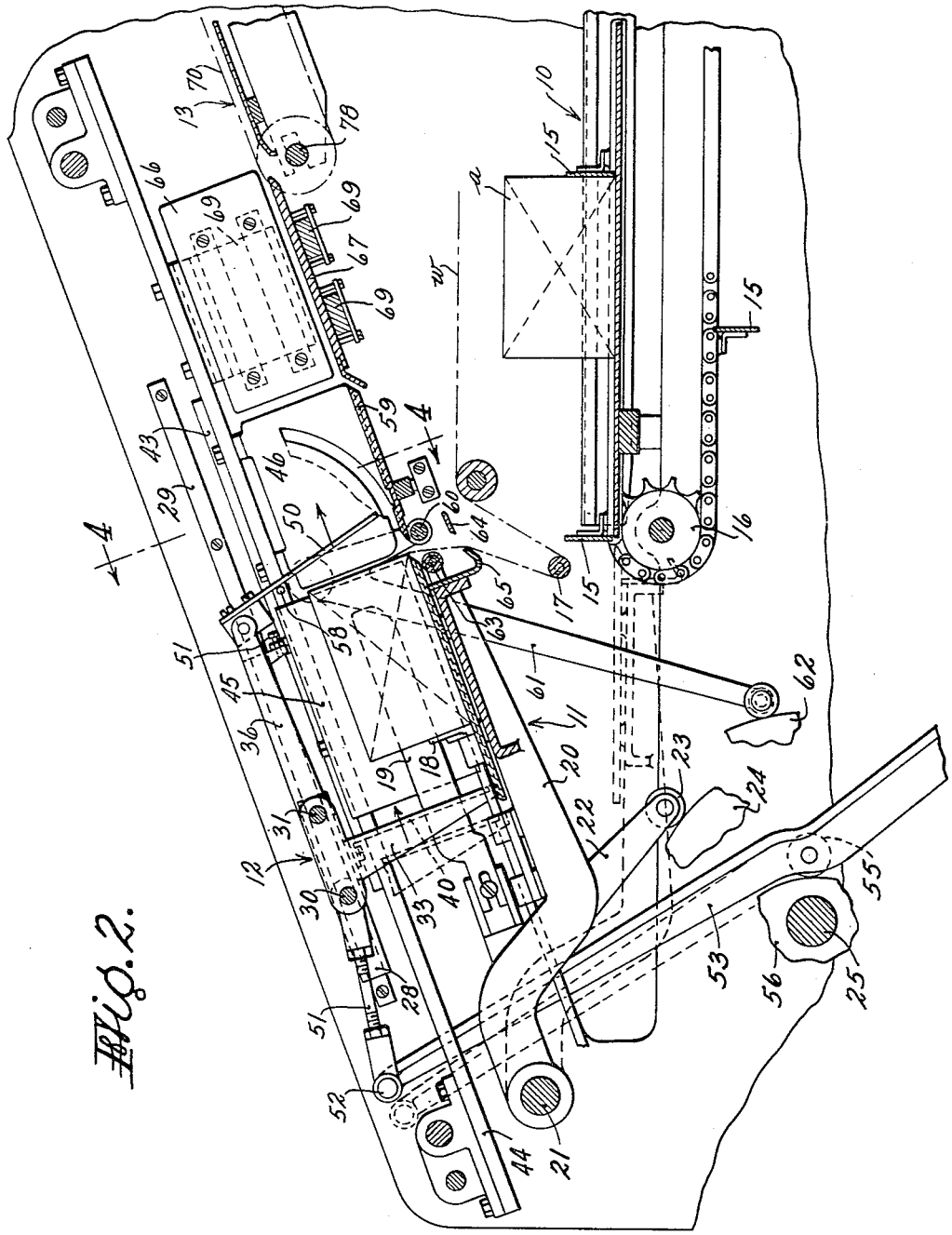

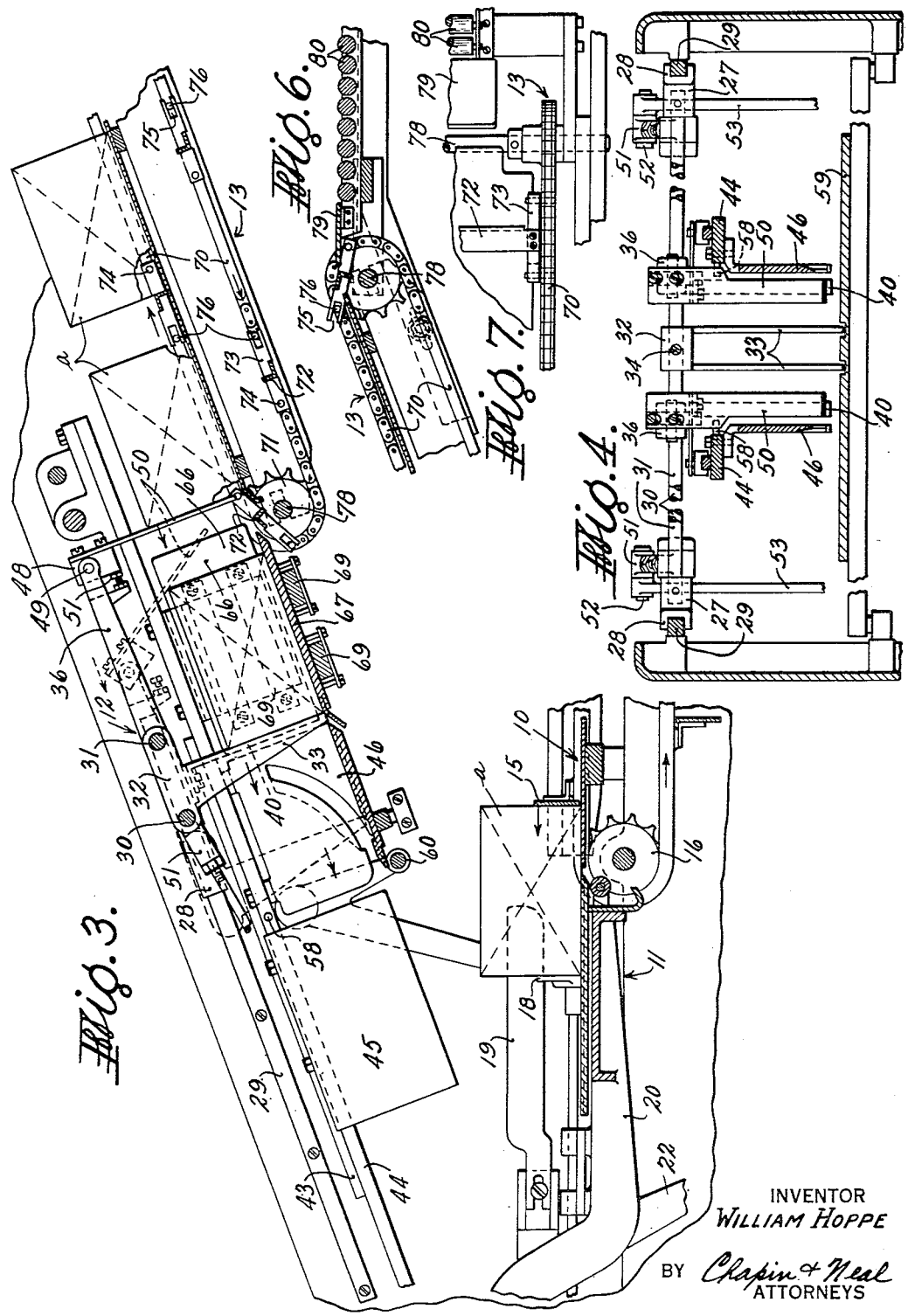

United States Patent Office 2,704,592
Patented Mar. 22, 1955

2,704,592

CONVEYER AND TRANSFER MECHANISM FOR WRAPPING MACHINES

William Hoppe, Longmeadow, Mass., assignor to National Bread Wrapping Machine Co., East Longmeadow, Mass., a corporation of Massachusetts Application May 19, 1951, Serial No. 227,232

7 Claims. (Cl. 198—24)

This invention relates to an improvement in wrapping machines, and more particularly to a conveying mechanism for feeding articles to, through and from the wrapping instrumentalities.

One object of the invention is to provide a mechanism for the above purpose which will make possible a reduction in the overall size of wrapping machines and provide a more efficient structure with a reduction in the number and weight of the parts.

A further object is to convey the articles through the machine in a manner such that the operating parts are more accessible for adjustment and service.

Other and further objects will be made apparent in the following specification and claims.

In the accompanying drawings,

Fig. 1 is a side elevational view of a wrapping machine embodying the invention, showing the parts in the position at which an article is delivered to the transfer member, parts being broken away;

Figs. 2 and 3 are similar views, on a larger scale, showing the parts in succeeding positions;

Fig. 4 is a sectional view substantially on line 4—4 of Fig. 2;

Fig. 5 is a detail sectional view substantially on line 5—5 of Fig. 1;

Fig. 6 is a detail sectional view showing the manner of connecting the flights to the discharge conveyer; and Fig. 7 is a plan view of the structure shown in Fig. 6.

The conveying mechanism of the present invention is advantageously used with wrapping instrumentalities of the general type shown in prior Patent 2,347,560, issued April 25, 1944, and except as to such modifications and rearrangements of the parts thereof as contribute to and form part of the present invention, the wrapping and wrapper feeding means are not here described in detail.

Referring to the drawings, the conveying mechanism is shown as comprising a horizontally positioned, article infeed conveyer generally indicated at 10, a swinging transfer mechanism generally indicated at 11, an upwardly inclined reciprocable pusher mechanism generally indicated at 12 and an upwardly inclined discharge conveyer generally indicated at 13.

The article infeed conveyer 10 comprises a pair of endless chains 14 which carry spaced article engaging flights 15. The chains 14 are trained around suitable sprockets 16, which are intermittently driven by any suitable means not shown.

As shown in Fig. 1, the conveyer 10 has come to rest as it delivers an article $a$ onto the transfer mechanism 11, in horizontal position, carrying with it the end portion of a wrapper web, indicated in dotted lines at $w$, which has been positioned between the advancing article and the transfer means by a suitable feeding means. The wrapper feeding means includes a draping roll 17 and is preferably of the type shown in prior Patent 2,451,287, issued October 12, 1948. The transfer device carries a backing member 18 frictionally mounted thereon which is engaged and moved by the article as the latter advances onto the transfer device and the latter is also provided with side folders 19 which, as described in the first above-mentioned patent, fold the portions of the wrapper, extending outwardly from the advancing face of the article, against the ends of the article.

The transfer member is carried by arms 20 secured to a rock shaft 21. Rock shaft 21 is provided with an arm 22 (Fig. 2) carrying a cam roll 23 engaging a cam 24, secured to a cam shaft 25, by which shaft 21 is rocked to swing the transfer member from the position of Fig. 1 to the position of Fig. 2.

As the movement of the article onto the transfer device is completed as shown in Fig. 1, the pusher mechanism 12 is returning from its forward position to its rear position, the latter position being shown in dotted line in Figs. 1 and 2.

As soon as an aricle is positioned on the transfer member the latter swings upwardly in a continuous movement to the position shown in Fig. 2. During the course of the upward movement of the transfer member the pusher mechanism completes its return movement and has advanced to the full line position of Fig. 2 as the transfer mechanism reaches its uppermost position as shown in the latter figure.

The reciprocable pusher mechanism comprise a carriage made up of the side members 27 provided with ways 28 slidable on guides 29 (Fig. 4) and connected by rods 30 and 31. Centrally mounted on rods 30 and 31 is head 32 from which project spaced, downwardly extending pusher fingers 33. Head 32 is held in adjusted position on rods 30 and 31 by set screw 34.

Mounted on rods 30 and 31 at each side of head 32 are bar members 36 adjustably held in place by set screws 37. Bolted at 38 to the underside of each member is a sidewise extending plate 39 and a downwardly extending pusher member 40, the pusher members 40 being transversely aligned with pusher fingers 33, and positioned to engage the article adjacent the ends. The outer ends of plates 39 carry blocks 41 formed with ways 42 riding on guides 43. The guides 43 are supported by frame members 44 from which the successive stationary folders 45 and 46 are suspended.

The forward ends of bars 36 are forked to receive blocks 48, pivoted in the forks as at 49. A pusher 50 is secured to each block 48, the pushers 50 being spaced ahead of pushers 33—40 a distance at least equal to the maximum fore and aft dimension of the articles to be accommodated. The pusher carriage reciprocates in an upwardly inclined plane and the downward swing of pushers 50 about their pivots is limited by adjustable stops 51 carried by the bar members 36.

The pusher carriage is reciprocated by adjustable links 51 pivotally connected at one end to rod 30, adjacent the side members 27, the other ends of the links being pivotally connected at 52 to the upper end of respective levers 53. The levers 53 are pivoted at their lower ends to the machine frame, as indicated in Fig. 1 at 54, and carry cam rolls 55 intermediate their ends which engage cams 56 fixed to the cam shaft 25.

As the article with its wrapper is moved upwardly to the position of Fig. 2, the endwise extensions of the wrapper are engaged by the fixed folders 45 and folded downwardly against the ends of the article. As the transfer means reaches the position of Fig. 2, the advancing pushers 33—40 are short of contact with the article, and the pushers 50 are held in slightly forwardly tilted position by fixed pins 58, so that the article enters beween the folders 45 free of interference from the rear and forward pushers.

On further advance of the pusher carriage, pushers 33—40 engage the backing member 18 and advance it and the article between the folders 45 and onto the inclined platform 59. Before the movement of the article onto platform 59 is completed and while the rear portion of the article is still on the transfer member, the pusher carriage is halted, and the transfer member starts its downward movement, which is uninterrupted, to withdraw the backing member 18 from between the pushers 33—40 and the package and clear of platform 59. Substantially simultaneously with or shortly before, the resumption of forward movement of the pusher carriage a roll 60 (Fig. 2) carried by one arm of a bell crank 61, which is actuated by a cam 62 fixed to cam shaft 25 presses the wrapper against a roll 63, carried by the transfer means, and a movable knife blade 64 is actuated (by means not shown) to engage fixed blade 65 and shear the wrapper.

Further forward movement of the pusher carriage causes the pushers 33 and 40 to directly engage the article and carry it through the folders 46 and into a sealing box comprising side plates 66 and platform 67. The plates 66 and platform 67 are heated in any suitable manner, as by electrical heating elements 69. The sealing box acts to heat seal the folds and seams of the wrapper in the usual manner.

As the rear pushers 33—40 advance the article past the folding members, the forward pushers 50 move the article previously left in the sealing box from the latter, as shown in Fig. 3, and into the path of the flights of the discharge conveyer, shortly to be described.

When the pusher carriage reaches its foremost position as shown in full lines in Fig. 3, the transfer device 11 has already returned to its lower position and an article has been advanced partway onto the transfer device by the infeed conveyer, as shown in the latter figure. The advancing movement of the infeed conveyer is started just after the transfer mechanism leaves its uppermost position so that the flight 15 thereof which halted at the edge of the transfer mechanism after delivering an article thereto rounds the sprockets 16 clear of the downcoming transfer device and the article being advanced by the succeeding flight advances onto the transfer mechanism as soon as the latter reaches its lower position.

As the pusher carriage draws back from the full line position of Fig. 3, the pivoted pusher 50 engages the forward edge of the article left in the sealing box and is swung upwardly thereby pawl fashion as shown in dotted lines in the latter figure. The return movement of the pusher carriage is continuous and its further movement brings the parts to the position of Fig. 1 where the transfer mechanism is ready to start its upward swinging movement, prior to the completion of the return movement of the pusher carriage.

Referring to Figs. 3, 6 and 7, the discharge conveyer 13 comprises spaced chains 70 trained around sprockets 71. Extending between the chains 70 are flights 72 connected at their ends to side pieces 73 The side pieces 73 are pivotally connected at their leading ends to pins 74 carried by a link of the chains while their trailing ends are provided with slots 75 which slidably and pivotally engage pins 76 carried by a succeeding chain link. By this arrangement the flights 72 drop below the periphery of the sprockets as they round the latter as shown in Figs. 3 and 6 while clearing the sprocket shafts 78.

Conveyer 13 is constantly driven by any suitable means (not shown) and is timed so that as the forward pusher 50 reaches its limit of forward movement carrying a wrapped article from the sealing box, a flight 72 has rounded the rear sprockets 71 and is advancing both forwardly and upwardly toward the lower rear edge of the article Because of the flight mounting just described, the flight is below the lower ends of the pusher members 50 until the proximate moment when the pushers retreat from the article and the flight engages the article. The disengagement of the pushers from, and the engagement of the flight with the article, are substantially simultaneous. The upper edge of the flight may, and in practice usually does, momentarily engage the lower ends of the pushers as the control of the article is transferred from the pushers to the flight but without damage as the pivotal connection at the upper ends of the pushers 50 and the inclination of the face of the flight 72, as it advances upwardly and forwardly, combine to permit an unresisted disengagement of the pushers and flight.

By the arrangements described there is a constant, steady, smooth flow of articles to and through the wrapping instrumentalities. The articles come in on a horizontal plane, are swung into an upwardly inclined plane and are moved along the latter through the wrapping mechanisms. As compared with previous arrangements the position of the transfer mechanism and the associated wrapping instrumentalities is very substantially lowered and brought within the easy reach of the operator for supervision and adjustment The upward inclination of the wrapping channel also permits a rapid forward movement of the pushers without overthrow of the article, and a quick engagement of the discharge flights with the article.

The described mechanism for conveying the articles to, through and from the wrapping instrumentalities permits the adjustment or substitution of the wrapping instrumenalities to meet a wide range of sizes of articles without change in the speed of delivery of the articles or timing of the conveyer elements.

From the discharge conveyer 13 the articles are received on platform 79 preferably provided with anti-friction rolls 80.

It will be understood that part or all of the folding and sealing plates may be spring mounted and made adjustable and that conventional yielding guide bars may be employed where needed in conformity with wrapping practice and the type of article being handled.

What is claimed is:

1. A mechanism for conveying articles to, through and from wrapping instrumentalities which comprises, an article transfer member mounted for pivotal swinging movement from a horizontal plane to an upwardly inclined plane, the movement of said transfer means between said planes being continuous, an intermittently operated endless conveyer provided with article conveying flights traveling in said horizontal plane for delivering articles to the transfer means, a reciprocable pusher device traveling in said upwardly inclined plane and provided with pusher members for advancing an article from the transfer device and along said inclined plane said pusher mechanism having an interrupted forward movement and a continuous rearward movement, the second portion of the forward movement and the continuous return movement of the pusher mechanism substantially coinciding with the downward and upward movements of the transfer means, and a constantly operating endless conveyer traveling in said inclined plane and provided with flights positioned to engage and advance an article from the foremost position in said inclined plane reached by said pusher means.

2. A mechanism for conveying an article to, through and from wrapping instrumentalities which comprises, an article advancing means traveling in a horizontal plane, a reciprocable pusher mechanism traveling in an upwardly inclined plane above said horizontal plane, an article transfer member mounted for pivotal swinging movement from said horizontal plane into said upwardly inclined plane, said pusher mechanism including spaced, downwardly extending rear and forward pusher members, means to actuate said article advancing means to deliver an article onto said transfer means when the latter is in said horizontal plane, actuating means to swing said transfer means upwardly to position the article carried thereby in said upwardly inclined plane and forwardly of said rear pusher member, actuating means to advance said pusher mechanism and pusher members to advance the article from the transfer member to a first position in said upwardly inclined plane as said forward pusher member advances an article from said first position to a second position, and an endless conveyer having flights engaging the lower rear edge of an article as it is left in said second position to continue the advance of the article in said inclined plane.

3. A mechanism for conveying an article to, through and from wrapping instrumentalities which comprises an article advancing means traveling in a horizontal plane, a reciprocable pusher mechanism traveling in an upwardly inclined plane above said horizontal plane, an article transfer member mounted for pivotal swinging movement to and from said planes, said pusher mechanism comprising a carriage provided with spaced downwardly extending rear and forward pusher members, said forward pusher members being mounted for free forward and upward swinging movement relative to the carriage, means to actuate said article advancing means to deliver an article onto said transfer means when the latter is in said horizontal plane, means to swing said transfer means upwardly to position the article carried thereby in said upwardly inclined plane and forwardly of said rear pusher member and actuating means to advance said pusher carriage with its pusher members to advance the article from the transfer member to a first position in said upwardly inclined plane as said forward pusher member advances an article from said first position to a second position.

4. A mechanism for conveying articles to, through and from wrapping instrumentalities which comprises, an article transfer member mounted for pivotal swinging movement from a horizontal plane to an upwardly inclined plane, the movement of said transfer means between said planes being continuous, an intermittently operated endless conveyor provided with article conveying flights traveling in said horizontal plane for delivering articles to the transfer means, a reciprocable pusher device traveling in said upwardly inclined plane and provided with pusher members for advancing an article from the transfer device and along said inclined plane said pusher mechanism having an interrupted forward movement and a continuous rearward movement, the second portion of the forward movement and the continuous return movement of the pusher mechanism substantially coinciding with the downward and upward movements of the transfer means, and an endless conveyer traveling in said inclined plane and provided with flights each having a limited pivotal movement about a point on the conveyer forwardly of the flight.

5. In a conveyer mechanism having a reciprocating article pusher and an endless conveyer, said conveyer comprising spaced chains trained around sprockets, and article engaging flights extending between the chains for advancing an article positioned by the pusher forwardly of and adjacent the axis of the sprockets, said flights having a limited pivotal movement about points on the chains forwardly of the flight and a limited pivotal and sliding movement about points on the chains rearwardly of the flight said points being spaced sufficiently from the flight to lower the flight below the surface of the chains as the flights round said sprockets to thereby clear the pusher as the latter retreats from the article.

6. An endless conveyer comprising spaced chains trained around sprockets, respective side members each pivotally connected at one end to said chains, the other end of said members being formed with slots, pins carried by the chains and slidably and pivotally engaging in said slots, and an article engaging flight having its ends connected to said side members intermediate the ends of the latter and spaced therefrom a distance to lower the flight below the radial outer surface of the chains as the latter round the sprockets.

7. A mechanism for conveying articles to, through and from wrapping instrumentalities which comprises, an article transfer member mounted for pivotal swinging movement from a horizontal plane to an upwardly inclined plane, the movement of said transfer means between said planes being continuous, an intermittently operated endless conveyer provided with article conveying flights traveling in said horizontal plane for delivering articles to the transfer means, a reciprocable pusher device traveling in said upwardly inclined plane and provided with pusher members for advancing an article from the transfer device and along said inclined plane said pusher mechanism having an interrupted forward movement and a continuous rearward movement, the second portion of the forward movement and the continuous return movement of the pusher mechanism substantially coinciding with the downward and upward movements of the transfer means, said pusher mechanism comprising a carriage provided with spaced downwardly extending rear and forward pusher members, said forward pusher members being mounted for free forward and upward swinging movement relative to the carriage, means to actuate said intermittently operated conveyer means to deliver an article onto said transfer means when the latter is in said horizontal plane, means to swing said transfer means upwardly to position the article carried thereby in said upwardly inclined plane and forwardly of said rear pusher member, actuating means to advance said pusher carriage with its pusher members to advance the article from the transfer member to a first position in said upwardly inclined plane as said forward pusher member advances an article from said first position to a second position, an endless constantly operating conveyer traveling in said inclined plane, said last-named conveyer comprising a pair of sprockets positioned rearwardly of but adjacent the forward position of said forward pusher members, chains trained around said sprockets, and article engaging flights extending between said chains positioned to engage the lower rear edge of an article, as it is left in said second position by the forward pusher, to continue the advance of the article in said inclined plane, said flights having a limited pivotal movement about points on the chains forwardly of the flight and a limited pivotal and sliding movement about points on the chains rearwardly of the flight to lower the flight below the surface of the chains as the flights round said sprockets to substantially clear the forward pusher as the latter retreats from the article.

References Cited in the file of this patent

UNITED STATES PATENTS

| | | |
|---|---|---|
| 1,083,558 | Powell | Jan. 6, 1914 |
| 1,535,386 | Walker et al. | Apr. 28, 1925 |
| 1,560,716 | Newdick | Nov. 10, 1925 |
| 1,597,961 | Farkas | Aug. 31, 1926 |
| 1,869,354 | Bletso et al. | Aug. 2, 1932 |
| 2,324,531 | Nordquist | July 20, 1943 |
| 2,347,560 | Hoppe | Apr. 25, 1944 |
| 2,451,287 | Hoppe | Oct. 12, 1948 |